March 30, 1937.    R. B. BOURNE    2,075,265
SOUND ATTENUATING DEVICE
Filed Aug. 9, 1935    4 Sheets-Sheet 1

INVENTOR
ROLAND B. BOURNE
BY
Chapin & Neal
ATTORNEYS

March 30, 1937.  R. B. BOURNE  2,075,265
SOUND ATTENUATING DEVICE
Filed Aug. 9, 1935  4 Sheets-Sheet 2

INVENTOR
ROLAND B. BOURNE
BY Chapin & Neal
ATTORNEYS

March 30, 1937. R. B. BOURNE 2,075,265
SOUND ATTENUATING DEVICE
Filed Aug. 9, 1935 4 Sheets-Sheet 3

INVENTOR
*Roland B. Bourne*
BY
*Chapin & Neal*
ATTORNEYS

March 30, 1937.   R. B. BOURNE   2,075,265
SOUND ATTENUATING DEVICE
Filed Aug. 9, 1935   4 Sheets-Sheet 4

INVENTOR
ROLAND B. BOURNE
BY Chapin & Neal
ATTORNEYS

Patented Mar. 30, 1937

2,075,265

UNITED STATES PATENT OFFICE 2,075,265

SOUND ATTENUATING DEVICE

Roland B. Bourne, Hartford, Conn., assignor to The Maxim Silencer Company, Hartford, Conn., a corporation of Connecticut Application August 9, 1935, Serial No. 35,428

13 Claims. (Cl. 181—59)

The present invention relates to sound attenuating devices, such as are used for example in silencing noisy engine exhausts and the like. Such silencing devices make use of so-called sidebranches which are acoustically coupled to a main sound conducting channel to produce attenuation of sound waves therein, either by a relatively direct interaction between the channel and the sidebranch or by the somewhat more complex action of a wave filter where a plurality of sidebranches are spaced apart along the main channel by distances bearing a definite relation to the major sound waves to be attenuated.

I have discovered that a very material saving of space in commercial silencer construction can be obtained by folding the sidebranch back upon itself one or more times, the successively folded portions being generally coaxial and of progressively increasing or decreasing diameter. The invention finds use primarily in so-called linear sidebranches, which by reason of their length being material in proportion to the wave length of the particular sound waves under consideration possess attenuating properties which are functions of the length of the sidebranch rather than its volume. In particular the utility of the invention will be especially marked in the case of a linear sidebranch closed at its end and folded upon itself in such a manner as to retain substantially the linear characteristics of a sidebranch of the same total overall length; although some of the structural advantages of the invention may be applied to sidebranches of the compound resonator type, where two or more separately acting resonators are connected in series by a restricted conducting passage. Acoustically these two types of sidebranch are wholly distinct, but in the manner in which space in construction is saved the invention presents features affecting both types.

Sidebranches folded on themselves in such a way that they preserve the characteristics of a single resonator of the same total length will be referred to throughout this specification as reflexed sidebranches. Careful tests with such sidebranches show that it is readily practicable to calculate their acoustic properties in substantially the same manner as though they were not reflexed, provided that proper care is given to the design of the sidebranch at the point where reflexing occurs so that the device is not converted into a compound resonator. Reflexed linear acoustic sidebranches are substantially as effective in attenuating pertinent sound frequencies in a main acoustic channel to which the sidebranch is acoustically coupled as are non-reflexed sidebranches of the same frequency characteristics.

One main advantage of a reflex linear sidebranch is seen to be in the saving in length. In cases where a limited space is available for installation purposes, the use of reflexed sidebranches permits the attenuation of lower frequencies than would otherwise be possible. For a sidebranch reflexed once, the saving in length is substantially fifty percent. The cross sectional area of the reflexed sidebranch is generally made the same as that of a non-reflexed sidebranch in order to secure the same acoustic properties. Since the reflexing is done coaxially this results in a greater overall diameter for the silencer; but the diameters of silencers employing linear sidebranches are usually relatively small so that this offers no serious objection. Furthermore, the diameter is not increased in the same proportion as the length is decreased, since the areas of the passages are functions of the squares of their diameters. I have found that it is desirable to make the cross sectional area of the reflexed sidebranch a function of the length of the sidebranch in the same manner as in the case of a non-reflexed sidebranch of the same acoustic properties. This applies to tapered sidebranches as well as to those of uniform cross sectional area. Slight variations of the form of the sidebranch from what would be given by a strict adherence to theory are of relatively slight importance.

Reflexed sidebranches may be used in conjunction with an associated main channel to form any type of selective acoustic device that can be formed with non-reflexed linear sidebranches. They may be used in connection with other kinds of sidebranches and with folded or reflexed main channels. Two reflexed sidebranches may be disposed in parallel or one non-reflexed sidebranch may be disposed in parallel with a reflexed sidebranch. Other advantages and applications are disclosed as the specification proceeds or will be apparent to those skilled in the art from the following description.

Referring to the drawings.

Unless otherwise stated, the term casing as used herein includes an inlet opening and an outlet opening in the respective ends thereof.

The embodiments of the invention herein shown are largely schematic and all are shown as employing circular cross sections. The inlet and outlet connections may be pipe flanges, sleeves or any other suitable arrangement for connecting the device to a conduit wherein sound waves may occur.

In a reflexed sidebranch which is functioning linearly the sound wave encounters no changes in acoustic impedance which are not functions of the distance along the sidebranch from its point of coupling to the main channel. In this way the acoustic operation of the reflexed sidebranches which form the subject of the present invention is distinguished from the action of compound resonators, in which two or more sidebranches are coupled in series to the main channel. The separate sidebranches of a compound resonator are connected by an acoustic element of relatively low conductivity, the sound wave encountering at the connecting zone a relatively sudden change of impedance which is no longer a function of the distance from the point of coupling to the main channel. Structurally some of the features of the present invention may find use in the application of compound resonators as silencing devices, but the acoustic operation of the structural features when arranged to function as a single reflexed sidebranch is wholly distinct from what it would be when arranged to function as two or more separate sidebranches in series or, in other words, a compound resonator. The difference in action may be produced by a relatively slight structural change, such as substituting a restricted conductivity for the evenness of the cross sectional area preserved throughout the reflexed portion of the reflexed main channel; but acoustically it results in entirely different effects.

Figure 1:
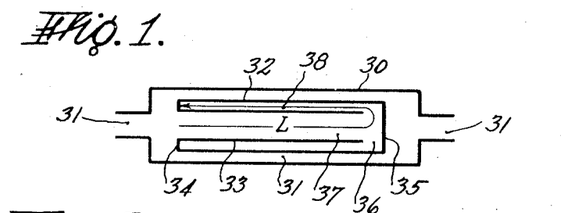
Figs. 1 to 6 inclusive are diagrammatic views showing the application of the invention to closed reflexed linear sidebranches of uniform cross sectional area.

In Fig. 1 is shown a simple embodiment of the invention comprising a casing 30 and an interiorly disposed composite member cooperating to form an annular main conducting channel 31 which merges into tubular form at the ends of the device. The interiorly disposed member comprises an outer shell 32 coaxial with the casing, an inner coaxial shell 33, and headers 34 and 35 closing the space between the shells 32 and 33 and the end of the shell 32 respectively. The shell 33 does not extend up to the header 35, thus leaving a circumferential opening 36. The interiorly disposed composite member as described forms a closed linear acoustic sidebranch, of an acoustic length L as shown by the arrow in the drawings. It will be seen that one end of the interior of the shell 33 is open to the main sound conducting channel, and that the sidebranch extends away from this point of coupling through the tubular passage 37, the circumferential opening 36, and the annular passage 38. In order to assure that the device will function as if constructed with a single sidebranch the cross sectional area of the sidebranch is maintained uniform throughout its length, including the reflexing zone. Since the area of the annular passage 38 is equal to $$\frac{\pi}{4}D_2^2 - \frac{\pi}{4}D_1^2$$

where $D_1$ is the diameter of the shell 33 and $D_2$ is the diameter of the shell 32, it can readily be calculated that in order to preserve uniformity of cross sectional area between the passages 37 and 38 $D_2$ must be equal to $$D_1\sqrt{2}.$$

The circumferential opening 36 must also be kept equal in area to the remainder of the reflexed passage of which it forms a part. By similar reasoning it can be calculated that to obtain this condition the length of this opening must be equal to one-fourth of the diameter of the shell 33. A sidebranch so proportioned and reflexed offers maximum attenuation to sound frequencies given by the relation $$\frac{\omega L}{\pi C} = 0.5, 1.5, 2.5, \text{etc.} \qquad (1)$$

where $\omega = 2\pi f$
$f$ = frequency of the sound wave,
$C$ = velocity of sound in the medium
$L$ = acoustic length of reflexed sidebranch as indicated in the drawing.

The above equation is identical with that applicable to a plain, non-reflexed cylindrical sidebranch closed at its far end and of acoustic length L.

Figure 2:
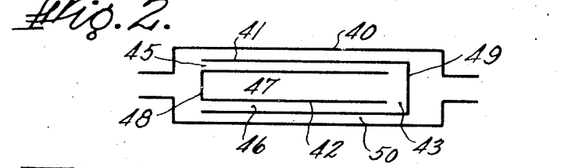

Fig. 2 shows a somewhat similar embodiment of the invention. It comprises a casing 40 and two interiorly disposed and nested cylinders 41 and 42 each closed at one end and positioned with the open end of the smaller cylinder adjacent the closed end of the larger but spaced therefrom so as to present a circumferential opening 43. This embodiment presents a sidebranch of length L having its coupling to the main channel through an annular portion 45 of the sidebranch. From the point of coupling the sidebranch comprises the annular passage 46, the cylindrical opening 43, and the tubular passage 47 closed at its far end. In this and other cases the headers are made of sufficient rigidity so that on the one hand they will not transmit appreciable sound energy through them; and on the other hand they will offer a substantially rigid reflecting surface, particularly at the point where the sidebranch is reflexed, as is the case with the header 49 which closes the end of the cylinder 41. In this case, as in that described previously, the passages 46 and 47 and the circumferential opening 43 are all of the same cross sectional area. The main channel 50 is formed between the casing 40 and the cylinder 41, and as in the former case is annular in its middle portion.

Figure 3:
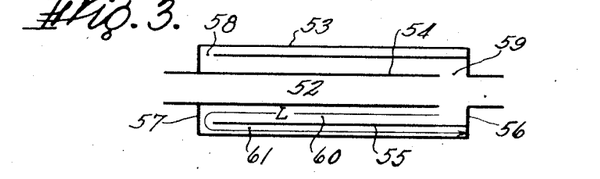

Fig. 3 shows a preferred embodiment of the invention in a simple form, the main channel 52 in this case extending centrally in a straight line through the enclosing casing 53. The reflexed sidebranch is formed by the casing 53, the conduit 54 which defines the main channel, and a cylindrical partition 55 which is attached to one header 56 of the casing and is spaced from the other header 57 to provide a circumferential opening 58. Coupling of the sidebranch to the main channel is in this case accomplished by the circumferential opening 59 between the conduit 54 and the header 56. In order to preserve the characteristics of the device as a single sidebranch the cross sectional areas of the passages 60 and 61 and of the circumferential opening 58 are all kept substantially equal. It is also preferable that the cross sectional area of the sidebranch be substantially greater than the area of the main channel, usually four times as great, this requirement being generally followed in the examples given although it is of particular importance in certain cases to be described where the sidebranches are arranged in such a way as to form an acoustic filter. Using these requirements it can readily be calculated by a process of reasoning similar to that previously used that $$D_{55} = D_{54}\sqrt{5}$$

and that $$D_{53} = 3D_{54}$$

the subscripts denoting the elements of which the diameters are being taken.

Figure 19:
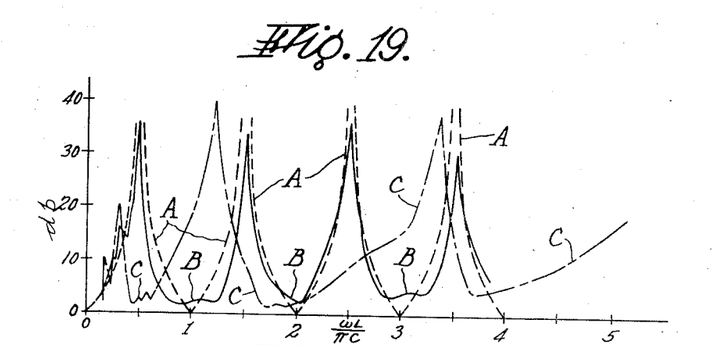
Figs. 19 to 21 inclusive are graphs showing the frequency vs. attenuation characteristics of certain of the embodiments of the invention.

The theoretical and actual performances of a device built in accordance with Fig. 3 are shown in Fig. 19. In that figure curve A is plotted from the attenuation vs. frequency characteristics of this device, the reflexed sidebranch being considered as a straight sidebranch of length L and the ratio of areas of the sidebranch to the main channel being four to one. The equation from which the plot is made is $$N_{db} = 10 \log\left(1 + 4 \tan^2 \frac{\omega L}{C}\right) \quad (2)$$

Curve B of the same figure is plotted from data experimentally determined from a silencer constructed in accordance with Fig. 3 with the sidebranch reflexed as shown. In making the test the silencing device was terminated on either end with an acoustically long line, Equation 2 being valid only on the supposition of such a line. The agreement between the calculated and observed values is striking, and shows definitely that the reflexed sidebranch does in fact act like a non-reflexed one of the same acoustic length. Curve B further shows that there is no acoustic reflection from the reflexing point 57, and that no appreciable loss of efficiency occurs by reason of the reflexing. The net result is that with no appreciable change in acoustic properties the overall length of the device has been cut approximately in half with but slight increase in diameter.

Figure 13:
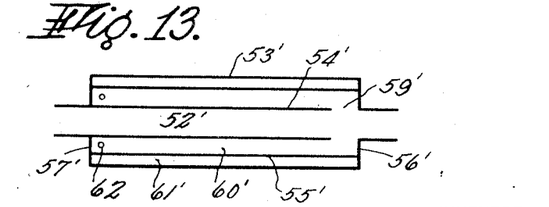
Fig. 13 is a similar view showing the application of certain features of the invention to compound resonators.

At this point the distinction between the utilization of the structural features of the invention to produce a reflexed sidebranch and the utilization of these features to produce a compound resonator can be shown with relation to Fig. 19. Curve C of this figure is plotted from experimentally determined data on a silencing device illustrated in Fig. 13. This device is structurally the same as that shown in Fig. 3, and the parts are therefore indicated by primed numerals. The only change that has been made is in the connection between the passages 60 and 61 which in the embodiment of Fig. 3 were connected to form a single continuous sidebranch by a circumferential opening 58 having the same area as the passages. In Fig. 13 the partition 55' is continued to the header 57 and one or more relatively small holes 62 are formed in it. The acoustic result of this change is to separate the passages 60' and 61' by a relatively abrupt change of cross sectional area, so that sound waves passing along them will encounter a similarly abrupt change in acoustic impedance. As will be seen from a comparison of curves B and C of Fig. 19 the change in the performance of the device is marked. The difference in performance perhaps is most graphically shown by a comparison of the peaks of greatest attenuation. With the reflexed sidebranch of Fig. 3, as would be the case with a single straight closed sidebranch of length L, these peaks come at $$\frac{\omega L}{\pi C} = 0.5, 1.5, 2.5, 3.5, \text{etc.} \quad (3)$$

With the compound resonator shown in Fig. 13 the peaks come at $$\frac{\omega L}{\pi C} = 0.303, 1.21, 3.34, 6.15, 7.68, 8.9, \text{etc.} \quad (4)$$

the exact location of the peaks being of course variable in accordance with the area of the coupling holes 62. A complete closure of the coupling holes, resulting in a single sidebranch of length L/2, will give peaks at $$\frac{\omega L}{\pi C} = 1, 3, 5, 7, \text{etc.} \quad (5)$$

These several results show clearly that the reflexing of the sidebranch produces merely a single sidebranch of the same total acoustic length, while the refolding of two series connected sidebranches one over the other produces a wholly different effect. As has been stated above, the physical features of the invention may have advantageous results in various acoustic environments, but it is important to realize that the reflexing of a sidebranch, in the sense in which that word is used here, does not make two series connected sidebranches out of it.

Figure 4:
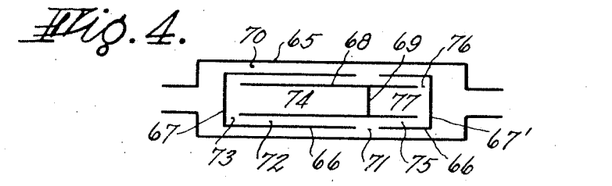

Another application of reflexed sidebranches is shown in Fig. 4. It comprises the generally cylindrical casing 65 and an interiorly, coaxially disposed unit comprising a cylindrical shell 66, closed at both ends by headers 67, 67', and an inner cylindrical shell 68, having a transverse header 69 positioned at a point intermediate its length. There is thus formed an annular main channel 70 between the casing 65 and the shell 66, and a pair of closed, reflexed sidebranches in parallel, acoustically coupled to the main channel 70 through a slot-like opening 71 in the cylinder 66 and positioned opposite the interiorly disposed header 69. One of this pair of sidebranches comprises an annular chamber 72, a passage 73 between one end of the cylinder 68 and the header 67, and a cylindrical passage 74; while the other of said pair comprises an annular channel 75, a passage 76 between the other end of said cylinder 68 and the header 67', and a cylindrical passage 77. It will be seen that there exists in this embodiment two closed reflexed linear acoustic sidebranches coupled in parallel to a main sound conduit. The relative lengths of these sidebranches are governed by the position of the opening 71 and the header 69. The acoustic performance of this device is substantially identical with that of a corresponding device having non-reflexed sidebranches.

Figure 5:
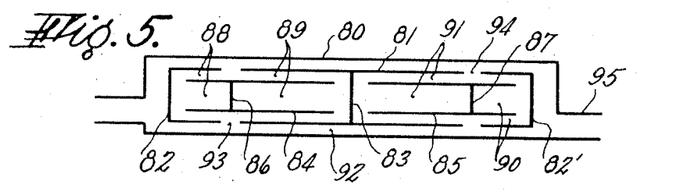

Fig. 5 shows a further application of the principles of the invention, particularly as shown in Fig. 4, whereby may be formed an acoustic wave filter having pairs of unequal sidebranches acoustically coupled to a main sound conduit at intervals along its length. It comprises a cylindrical casing 80 and an interiorly disposed cylindrical shell 81, closed at both ends by headers 82, 82' respectively and divided into two equal compartments by the transverse header 83. Within each of said compartments are nested coaxially disposed cylinders 84, 85 respectively, said cylinders having transverse headers 86, 87, respectively whereby are formed two pairs of reflexed sidebranches 88, 89 and 90, 91 substantially after the manner described in connection with Fig. 4. One of these pairs of sidebranches communicates with the annular main channel 92 through the opening 93 and the other through the opening 94. This construction is particularly adapted to services where the interior of the device may be flooded with water, as in submarine service. By having one or both of the end connections eccentric as at 95, and by installing the device in a horizontal position, it is readily seen that the entire device is self-draining, without recourse to special drain plugs and the like.

Figure 6:
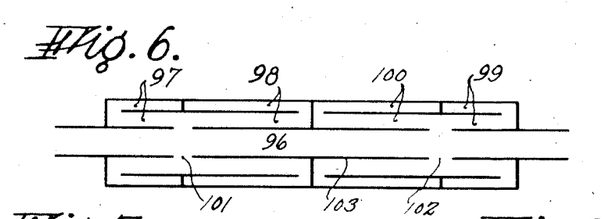

Fig. 6 shows an embodiment of the invention acoustically very similar to that of Fig. 5, except that the main conducting channel 96 extends straight through the device. The two pairs of reflexed sidebranches 97, 98 and 99, 100 communicate with said channel 96 through the respective openings 101, 102 in the centrally disposed conduit 103 by which the main channel is formed.

The embodiments thus far described all employ reflexed sidebranches having cross sectional areas uniform throughout their lengths. The principle of reflexing is likewise applicable to closed linear sidebranches whose areas change as a function of distance along their lengths. For instance, a complete closed circular cone with open base has many useful acoustic properties, as has been described in my Patent No. 2,017,744, granted October 15, 1935. One disadvantage in using conical sidebranches comes from the fact that they are substantially half a wave length long for their fundamental response frequency, as compared to a closed cylinder which is only one fourth wave long for its fundamental frequency, and therefore require a longer physical structure to attenuate the same sound frequency. The fact that the conical sidebranch responds to a full integral series of overtones is, however, of great acoustic importance. I have found that the acoustic properties of such a sidebranch are in no wise materially altered by reflexing while the length can be shortened in the same way as a cylindrical sidebranch.

Figure 7:
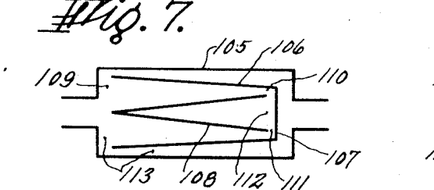
Figs. 7 to 10 inclusive are diagrammatic views showing the application of the invention to closed reflexed linear sidebranches of non-uniform cross sectional area.

Fig. 7 shows a simple application of a reflexed conical sidebranch. It comprises a cylindrical casing 105, an interiorly and coaxially disposed conical member 106 closed at its small end by a transverse header 107 and an inner complete cone 108. The various members are so proportioned that the cross-sectional area of the sidebranch so formed varies with distance from the coupling zone 109 at the base of the cone to the apex substantially after the manner for a true cone. For example, the annular opening 110, the peripheral opening 111, and the open end 112 of the cone 108 are each substantially equal to one-fourth of the area of the opening 109. The above described reflexted conical sidebranch is coupled to the main conducting channel 113 at the annular opening 109. The acoustic length L of the reflexed side branch is approximately equal to the sum of the slant heights of the two cones 106 and 108. The frequencies of maximum attenuation are given by $$\frac{\omega L}{\pi C} = 1, 2, 3, 4, \text{etc.} \qquad (6)$$

Figure 8:
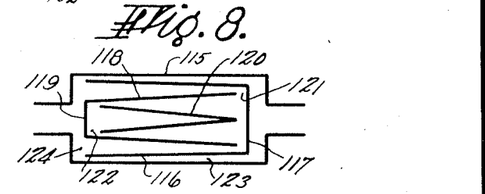

A closed conical sidebranch may be reflexed more than once without jeopardizing its operation acoustically. Figure 8 shows an embodiment of the invention employing an acoustic conical sidebranch reflexed twice along its length. It comprises a casing 115, and an interiorly disposed sidebranch unit made up of a conical member 116 closed at its smaller end by the transverse header 117, a conical member 118 nested within the member 116 and closed at its smaller end by the transverse header 119, and a conical member 120 nested within the member 118. These three members are so proportioned that the acoustic passage along the sidebranch suffers a progressive change in cross sectional area after the manner of a simple true circular cone but with no abrupt changes due to the folded construction. The cross section areas at the points of reflexure 121, 122 are made according to the area a true cone would have at the corresponding distance from the open end. It will be seen that the sidebranch is coupled to the main channel 123 through an annular opening 124. The acoustic performance of such a sidebranch is very closely equivalent to that of a corresponding simple non-reflexed cone.

Figure 9:
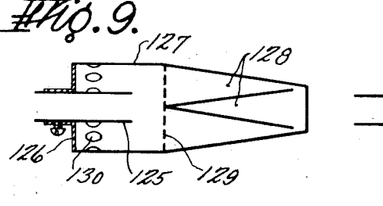

Fig. 9 shows an end-pipe silencer suitable for intakes where no further piping beyond the silencer is used and is particularly adapted to attenuating simple noises largely made up of a series of harmonically related overtones. It comprises a pipe 125 to which is adjustably affixed a transverse header 126 carrying a short cylindrical member 127 affixed at one end to the header, and having attached to its other end the single reflexed conical sidebranch 128. The cylinder 127 extends a short distance beyond the inner end of the centrally disposed conduit 125 and the reflexed conical sidebranch properly begins at the region denoted by the junction zone 129 between said cylinder 127 and the conical section 128. The main channel comprises the interior of the conduit 125, a portion of the interior of member 127 between the end of the pipe 125 and the zone 129, the annular space between the members 125 and 127, and a suitable opening or series of openings 130 in said cylinder 127 and located adjacent the header 126. This sidebranch is coupled to the aforementioned main channel at a point where the latter is reflexed after the manner described in my copending application Serial No. 14,370. The openings 130 might be placed in the header 126 without changing the action in any way. By making the header 126 adjustable along the length of the pipe 125 it is possible to tune this sidebranch to existing noises within certain limits by varying the length of the interior of the cylinder 127 adjacent the zone 129 which acts as a part of the sidebranch.

Figure 10:
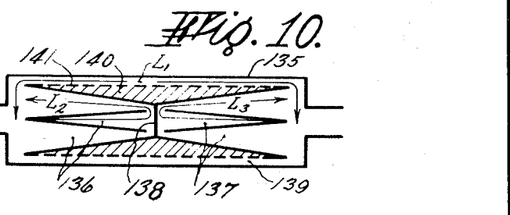
Figure 20:
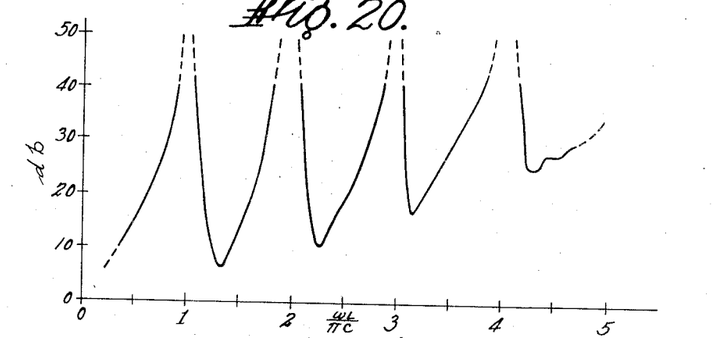

Fig. 10 shows an embodiment of the invention wherein use is made of two reflexed conical sidebranches acoustically coupled to a main sound conducting channel at spaced points along its length. It comprises a cylindrical casing 135, and two coaxially and interiorly disposed reflexed conical sidebranches 136, 137 respectively, each having a common transverse header 138. By making the respective acoustic lengths $L_2$ and $L_3$ equal, there results an acoustic wave filter which operates in accordance with the following:

$$\cosh \Gamma = \cos \frac{\omega L_1}{C} + \frac{S_2}{2S_1} \sin \frac{\omega L_1}{C} \left( \cot \frac{\omega L_2}{C} - \frac{1}{\frac{\omega L_2}{C}} \right) \quad (7)$$

wherein $L_1$ = the length of the main channel between sections
$S_2$ = the cross sectional area at the entrance to the sidebranches
$S_1$ = the cross sectional area of the main channel The transverse header 138, being of less diameter than the open bases of the cones, produces a contracted space around the cones which, in this embodiment, I have utilized for the introduction of a certain amount of acoustic resistance distributed along the main channel 139. This resistance is in the form of suitable sound absorbing material shown at 140 and held in place by a perforated cylindrical member 141, giving sound waves access to the absorbent material within. The amount of sound absorbing material used depends upon the size of the device. The major function of the sound absorbing material is to prevent series resonance in the main channel 139. Series resonance in sound attenuating devices is likely to result in reduced attenuation peaks especially if the resonant frequencies occur at or near the resonant frequencies of the sidebranches. The actual acoustic performance of a device built in accordance with Fig. 10 is shown in Fig. 20. The amount of sound absorbing material used was small although its effect becomes increasingly important with higher frequencies as is shown by the increased minima in the dips of the curve. The important fact to be noted in this curve is that the attenuation peaks occur at values of $$\frac{\omega L}{\pi C}$$

equal substantially to 1, 2, 3, etc. A solution of Equation 7 shows that maximum attenuation occurs at points slightly below those above referred to, the difference becoming less as the term $$\frac{1}{\frac{\omega L_2}{C}}$$

becomes smaller. The slope of the low frequency side of the attenuation peaks is less than the slope of the high frequency side due to the fact that the length of the main channel $L_1$ is slightly greater than the acoustic length of the sidebranches.

Figure 11:
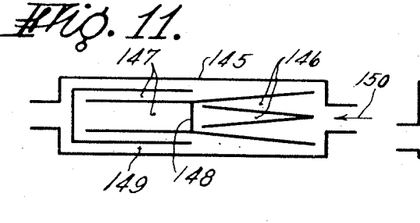
Figs. 11 and 12 are similar views showing the application of the invention to combinations of closed reflexed linear sidebranches partly of uniform and partly of non-uniform cross sectional area.

Fig. 11 shows how a reflexed linear sidebranch of uniform cross sectional area may be employed in connection with a reflexed sidebranch of non-uniform cross sectional area to obtain desirable mechanical and acoustic characteristics. A cylindrical casing 145 contains a reflexed conical sidebranch 146 and a reflexed cylindrical sidebranch 147. The transverse header 148 common to both sidebranches is of such a diameter that the necessary area relations as previously pointed out are preserved in both the conical sidebranch 146 and the cylindrical sidebranch 147. The maximum cross sectional area of the conical sidebranch, for this disposition, is twice the constant cross sectional area of the cylindrical sidebranch. Attenuation peaks occur at values of $$\frac{\omega L}{\pi C}$$

equal to .5, 1.0, 1.5, 2.0, etc., L being the acoustic length, identical for each sidebranch. It will be seen that the acoustic coupling to the main sound conducting channel 149 is very favorable especially for sound waves entering the device in the direction shown by the arrow 150. Each sidebranch provides attenuation in such a manner that their combination produces no pass bands having theoretically zero attenuation.

Figure 12:
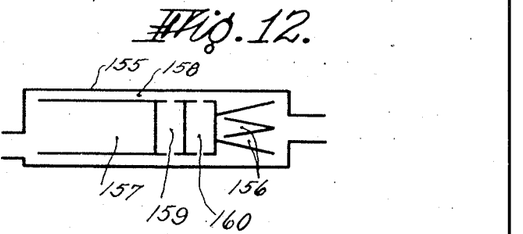

Fig. 12 shows a similar embodiment of the invention wherein a cylindrical casing 155 contains a reflexed conical sidebranch 156 and a non-reflexed cylindrical sidebranch 157 positioned as shown and forming a main sound conducting channel 158 through the device. The advantage of this embodiment over that shown in Fig. 11 lies in the fact that the cross sectional area of the closed cylindrical sidebranch 157 is equal in value to that of the conical sidebranch 156. As is well known in the art, increasing the area of a sidebranch with respect to the area of the sound conduit to which the branch is acoustically coupled results in greater attenuation over a wider band of sound frequencies. Additional volumetric sidebranches 159 and 160 may be added if desired to increase the overall attenuation.

Figures 14, 15, 16:
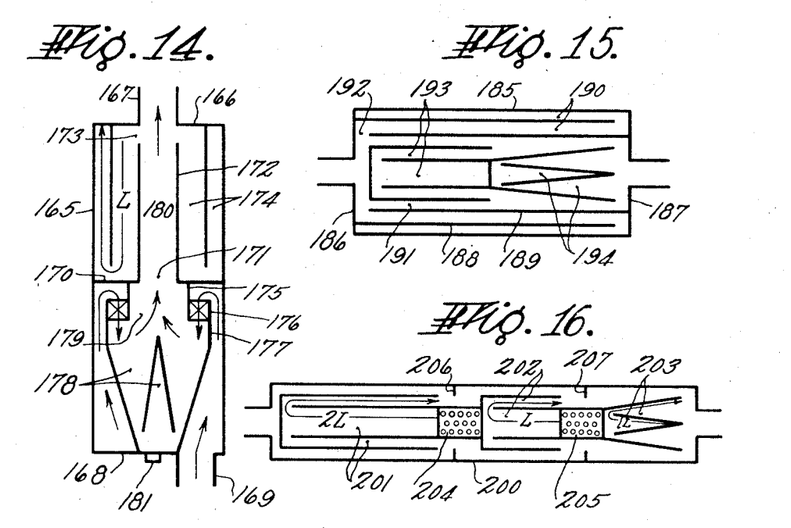
Figs. 14 to 16 inclusive are similar views showing further applications of the invention to combinations of reflexed linear sidebranches partly of uniform and partly of non-uniform cross sectional area.

Fig. 14 shows how the principle of the invention may be applied to a spark catcher type of exhaust silencer. The device comprises a cylindrical casing 165 having a top header 166 with a suitable outlet connection 167 and a bottom header 168 with an eccentrically disposed inlet connection 169. An intermediate header 170 having a centrally disposed opening 171 therein supports an upwardly extending centrally disposed tubular conduit 172. Said conduit 172 extends to a point in adjacency to the header 166 leaving a slot-like opening 173 which gives access to the reflexed acoustic sidebranch 174 of acoustic length L. Depending downward from the interior transverse header 170 is a cylinder 175 at the lower end of which and mounted exterior thereof are helical vanes 176 of a well known type designed to impart a whirling motion to the gases, the outside of which supports a short cylindrical member 177 extending down a short distance below said spinner assembly. A reflexed conical sidebranch 178 extends from the bottom of the cylinder 177 to the bottom header 168, the latter in this case forming the reflexing point. The acoustic length of the sidebranch 178 is generally made equal to that of sidebranch 174. The operation of the device is as follows. The exhaust gas bearing objectionable sound waves enters the device through the bottom inlet 169, passes upward around the outside of the conical sidebranch 178, is deflected downward by the transverse partition 170 through the spinner assembly 176, thence passes upward through the enlarged channel 179 formed by the cylinder 175, thence through the opening 171 into the channel 180 formed by the tubular conduit 172 and so on out through the outlet opening 167. The sound waves suffer attenuation due to the reflexed conical sidebranch 178 and the reflexed cylindrical sidebranch 174 which, it will be seen, are spaced apart along the main conducting channel. The entrained dirt, sparks, etc. are thrown out of the gas stream by being downwardly directed by the spinner assembly 176 into the sidebranch 178 from whence they may be removed through a suitable handhole 181.

Fig. 15 shows a further modification of the invention employing three reflexed sidebranches. This embodiment is particularly useful in cases where the length is of importance. Attenuation is provided for three sets of integrally related sound frequencies and no sound frequency can pass through the device without suffering substantial attenuation. It comprises a casing 185 having end headers 186, 187, and suitable inlet and outlet connections. Affixed to the header 186 is an interiorly disposed cylinder 188 which extends to a point in adjacency with the header 187. Nested within the cylinder 188 and affixed to the header 187 is a cylinder 189, extending therefrom to a point in adjacency to the header 186. There is formed thereby the reflexed cylindrical sidebranch 190 of acoustic length 2L acoustically coupled to the main sound conducting channel 191 through the slot-like opening 192. Co-axially mounted within this structure is a unit similar to that shown in Fig. 11 comprising the reflexed cylindrical sidebranch 193 and the reflexed conical sidebranch 194. Each of these two sidebranches has an acoustic length L. Attenuation maxima occur at values of $$\frac{\omega L}{\pi C}$$

equal to .25, .50, .75, 1.0 etc. The main conducting channel 149 is largely annular in form and has acoustically coupled to it the three reflexed sidebranches as shown.

In Fig. 16 is shown an embodiment somewhat similar to that of Fig. 15 except that all of the sidebranches are placed in line. It comprises a cylindrical casing 200, a reflexed cylindrical sidebranch 201 of length 2L, a reflexed cylindrical sidebranch 202, of length L, and a reflexed conical sidebranch 203 of length L. These three sidebranches are spaced longitudinally within the casing 200 to provide space for centrally disposed acoustically dissipative units 204, 205 as shown. These units consist of a body of sound absorbing material contained within a perforated metal housing. Affixed to the inside of the casing 200 and opposite the mid-point of the units 204, 205, are annular rings 206, 207. These rings are for the purpose of directing the exhaust gas and sound inwardly toward the sound absorbing units and to afford closer coupling between the cylindrical sidebranches and the main sound conducting channel. The rings also increase the high-frequency attenuation in the device.

Figure 21:
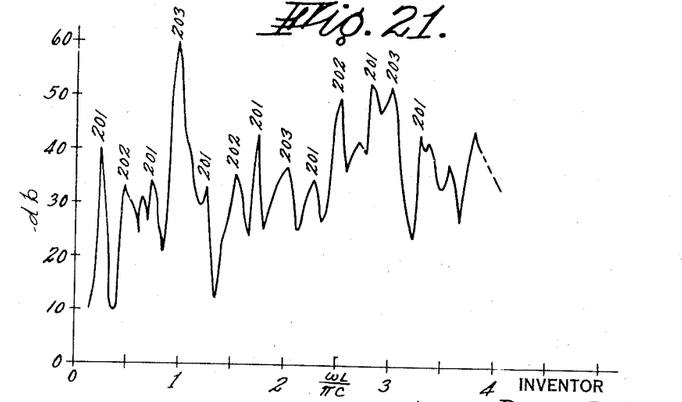

Fig. 21 shows a frequency versus attenuation curve plotted from measurements on a device in accordance with Fig. 16. It will be noted that the attenuation maxima correspond to the values given in connection with the device of Fig. 15. The various maxima are labeled with numbers which refer to the sidebranches involved, for instance the peak at $$\frac{\omega L}{\pi C} = 1$$

is that due to the reflexed cone 203. As to be expected from the theory the cone offers another attenuation region $$\frac{\omega L}{\pi C} = 2 \text{ etc.}$$

Figure 17:
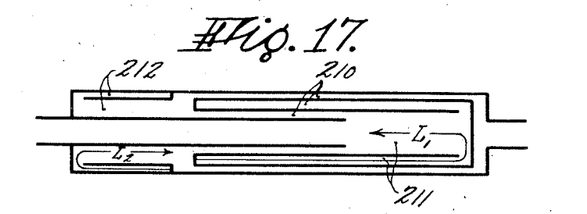
Fig. 17 is a view showing the combination of reflexed sidebranches with a reflexed main channel.

Fig. 17 shows still a further embodiment of the invention which also makes use of the principal of reflexed main channels as described in my co-pending application Serial No. 14,370 and consists acoustically of a main sound conducting channel 210 to which are acoustically coupled a reflexed cylindrical sidebranch 211 of acoustic length $L_1$ and a reflexed cylindrical sidebranch 212 of acoustic length $L_2$. Both of these sidebranches are coupled to the main channel 210 at points where the latter is reflexed affording very close acoustic coupling between the sidebranches and the main channel.

Figure 18:
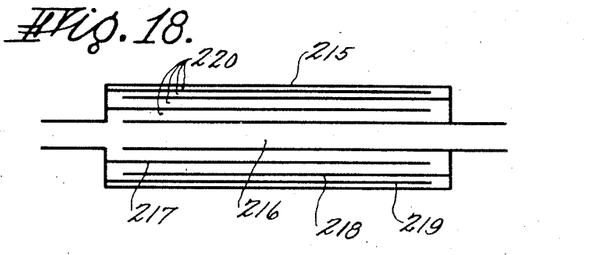
Fig. 18 is a similar view showing a sidebranch which has been reflexed three times.

The invention may also be applied to cases where a sidebranch is to be reflexed more than once. A case where the sidebranch is reflexed three times is shown in Fig. 18. In this figure a casing 215 contains a centrally extending main channel 216. Outside of this channel cylindrical shell 217, 218 and 219 extend alternately from each header to a point adjacent the other, so as to leave gaps by which the successive annular portions of the reflexed sidebranch 220 are coupled together. In this, as in the other cases previously described in which cylindrical sidebranches are used, the cross sectional area of the sidebranch in its successive sections and the cross sectional areas of the coupling gaps are all kept constant. Other variants of the fundamental idea described above will become apparent in the adaptation of the invention to specific applications.

I claim:

1. An acoustic sidebranch defined by two nested members each closed at one end, and open at the other, the open end of the smaller member being located in adjacency to the closed end of the larger member but spaced therefrom so as to provide a communication between the two members.

2. An acoustic linear sidebranch defined by two nested members each closed at one end and open at the other, the open end of the smaller member being spaced from the closed end of the larger member to provide a continuous passage from the larger member into the smaller member.

3. An acoustic linear sidebranch defined by two nested members each closed at one end and open at the other, the open end of the smaller member being spaced from the closed end of the larger member to provide a continuous passage from the larger member into the smaller member of substantially the same cross sectional area as the cross sectional area of the space within the adjacent end of the smaller member.

4. A linear acoustic sidebranch defined by two nested members each closed at one end and open at the other, the open end of the smaller member being spaced from the closed end of the larger member to provide a continuous passage from the larger member into the smaller member, the cross sectional areas of the two members and the spacing of the open end of the smaller member from the closed end of the larger member being such that the sound waves passing along the combined lengths of the two members encounter no abrupt changes in the acoustic impedance along said passage.

5. A closed acoustic sidebranch comprising a cylindrical section in series with an annular section of equal cross sectional area, said cylindrical section being nested within said annular section.

6. An acoustic sidebranch as claimed in claim 5, one end of said annular channel being acoustically coupled to a main sound conducting channel.

7. An acoustic silencing device comprising a casing having inlet and outlet openings at its ends, a cylindrical member positioned within the casing and having end closures and an intermediate circumferential opening, and a tubular member positioned within the cylindrical member with a passage at its ends into the annular space between the tubular and the cylindrical members, and an intermediate partition within the tubular member.

8. An acoustic silencing device comprising a casing having inlet and outlet openings at its ends, a cylindrical member positioned within the casing and having end closures and an intermediate circumferential opening, and a tubular member positioned within the cylindrical member with a passage at its ends into the annular space between the tubular and the cylindrical members, the cross sectional areas of the annular space between the cylindrical and the tubular members, the interior of the tubular member, and the passages at the ends of the tubular member being substantially equal, and a partition within the tubular member positioned substantially opposite the circumferential opening in the cylindrical member.

9. An acoustic silencing device comprising a casing having inlet and outlet openings at its ends, a cylindrical member positioned within the casing and having end closures, a pair of circumferential openings, and a centrally disposed partition, a pair of tubular members, one located within the cylindrical member on each side of the central partition, the tubular members each having open ends located one near an end closure of the cylindrical member and one near the central partition, the cross sectional areas of the annular spaces between the cylindrical and the tubular members, the interior of the tubular members, and the passages between the ends of the tubular members and the closures and partitions being substantially equal, and partitions located within the tubular members at points opposite the circumferential openings in the cylindrical members, said partitions and openings being asymmetrically disposed with respect to the longitudinal center of the tubular members.

10. An acoustic silencing device comprising a casing having inlet and outlet openings at its ends, a conduit extending axially through the casing and having an intermediate circumferential opening, an intermediate tubular member located in the space between the casing and the conduit and having passages at its ends between the annular spaces inside of and outside of the member, and a partition between an intermediate portion of the tubular member and the inside of the casing.

11. An acoustic silencing device comprising a casing having inlet and outlet openings at its ends, a conduit extending axially through the casing and having an intermediate circumferential opening, an intermediate tubular member located in the space between the casing and the conduit and having passages at its ends between the annular spaces inside of and outside of the member, the cross sectional areas of said spaces and passages being substantially equal, and a partition between an intermediate portion of the tubular member and the inside of the casing.

12. An acoustic silencing device comprising a casing having inlet and outlet openings at its ends, a conduit extending axially through the casing and having a pair of spaced circumferential openings, a central partition between the casing and the conduit, an intermediate tubular member located in each space between the casing and the conduit and having passages at its ends between the annular spaces inside of and outside of said member, the cross sectional areas of said spaces and passages being substantially equal, and a partition between each tubular member and the inside of the casing at a point opposite the corresponding circumferential opening in the conduit, said partitions between the tubular members and the inside of the casing and said circumferential openings being asymmetrically located with respect to the longitudinal center of the tubular members.

13. An acoustic silencing device comprising a main sound conducting channel, an annular passage coaxial with the main sound conducting channel and having at one end a coupling connection with said channel extending substantially throughout the circumferential extent thereof, and a chamber coaxial with the main sound conducting channel and with said annular passage, said chamber being closed at one end and having at its other end a coupling connection with that end of the annular passage remote from the coupling connection between said annular passage and the main sound conducting channel, the coupling connection between the annular passage and the chamber extending substantially throughout the circumferential extent of said passage, whereby sound waves passing from the main sound conducting channel through the annular passage and the chamber will at any point in their path be substantially in phase throughout the circumferential extent of said path.

ROLAND B. BOURNE.